United States Patent [19]

Matsumoto

[11] Patent Number: 4,787,269
[45] Date of Patent: Nov. 29, 1988

[54] POWER TRANSMITTING SYSTEM FOR A FOUR-WHEEL DRIVE VEHICLE

[75] Inventor: Rempei Matsumoto, Ohta, Japan

[73] Assignee: Fuji Jukogyo Kabushiki Kaisha, Tokyo, Japan

[21] Appl. No.: 50,599

[22] Filed: May 14, 1987

[30] Foreign Application Priority Data

| May 23, 1986 | [JP] | Japan | 61-119490 |
| May 23, 1986 | [JP] | Japan | 61-119491 |
| May 26, 1986 | [JP] | Japan | 61-120403 |
| Jul. 11, 1986 | [JP] | Japan | 61-163030 |

[51] Int. Cl.$^4$ ............................................. F16H 37/06
[52] U.S. Cl. ................................ 74/665 GA; 180/247; 74/674
[58] Field of Search ................. 74/714, 665 GA, 674; 180/247, 248, 249

[56] References Cited

U.S. PATENT DOCUMENTS

| 3,963,085 | 6/1976 | Vinton | 180/247 |
| 4,373,604 | 2/1983 | Lunn et al. | 180/247 |
| 4,541,503 | 9/1985 | Akutagawa et al. | 180/247 X |

FOREIGN PATENT DOCUMENTS 0083617  6/1980  Japan ................................. 180/247

Primary Examiner—Dirk Wright
Attorney, Agent, or Firm—Martin A. Farber

[57] ABSTRACT

A planetary gear device is provided in a power transmitting system. First and second clutches are provided on a front drive shaft and a rear drive shaft respectively. One of members of the planetary gear device is operatively connected to the front drive shaft through the first clutch and another member of the planetary gear device is operatively connected to the rear drive shaft through the second clutch. Both clutches are selectively engaged in accordance with driving conditions for providing proper distribution of torque to the front and rear wheels of the vehicle.

20 Claims, 5 Drawing Sheets

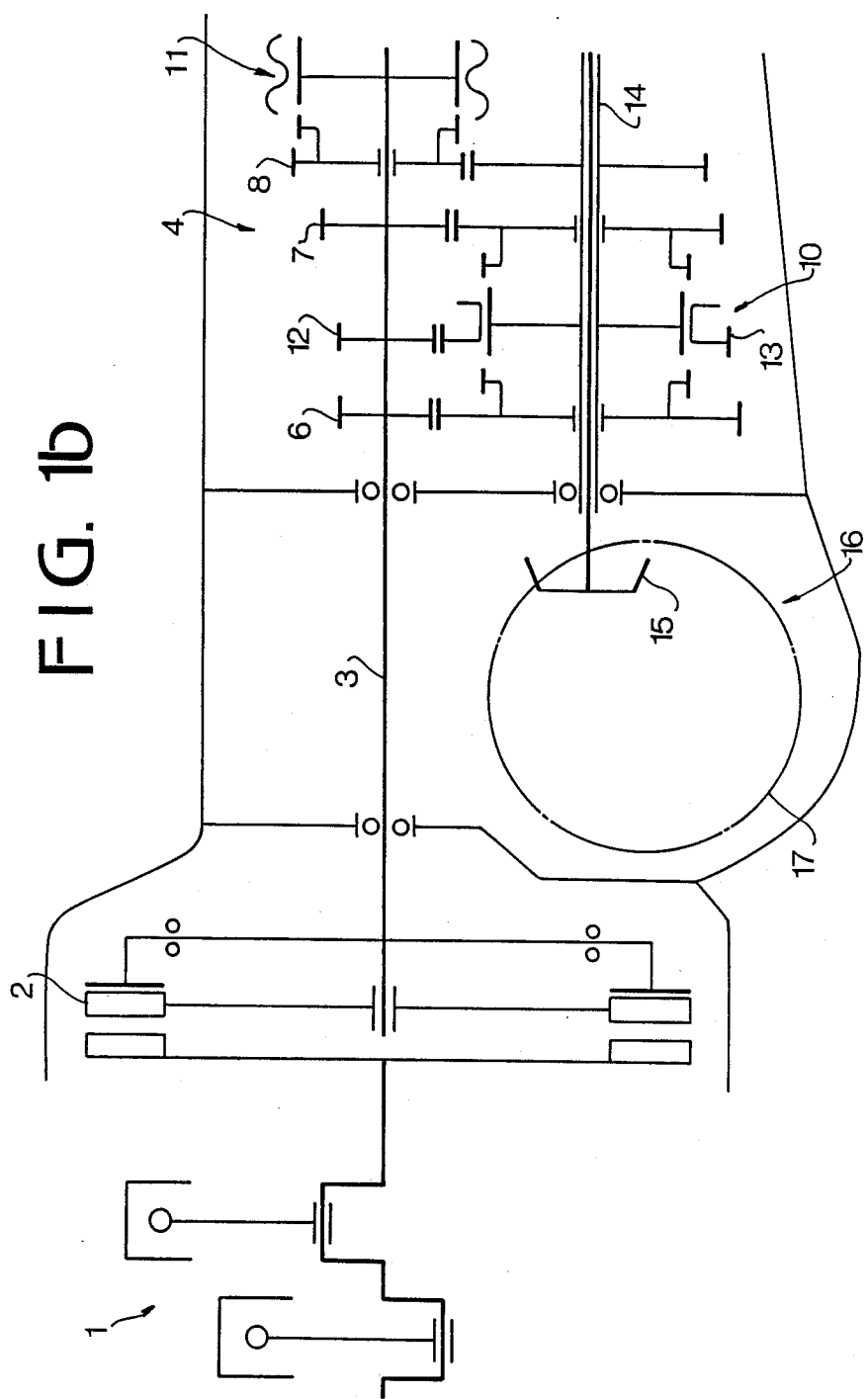

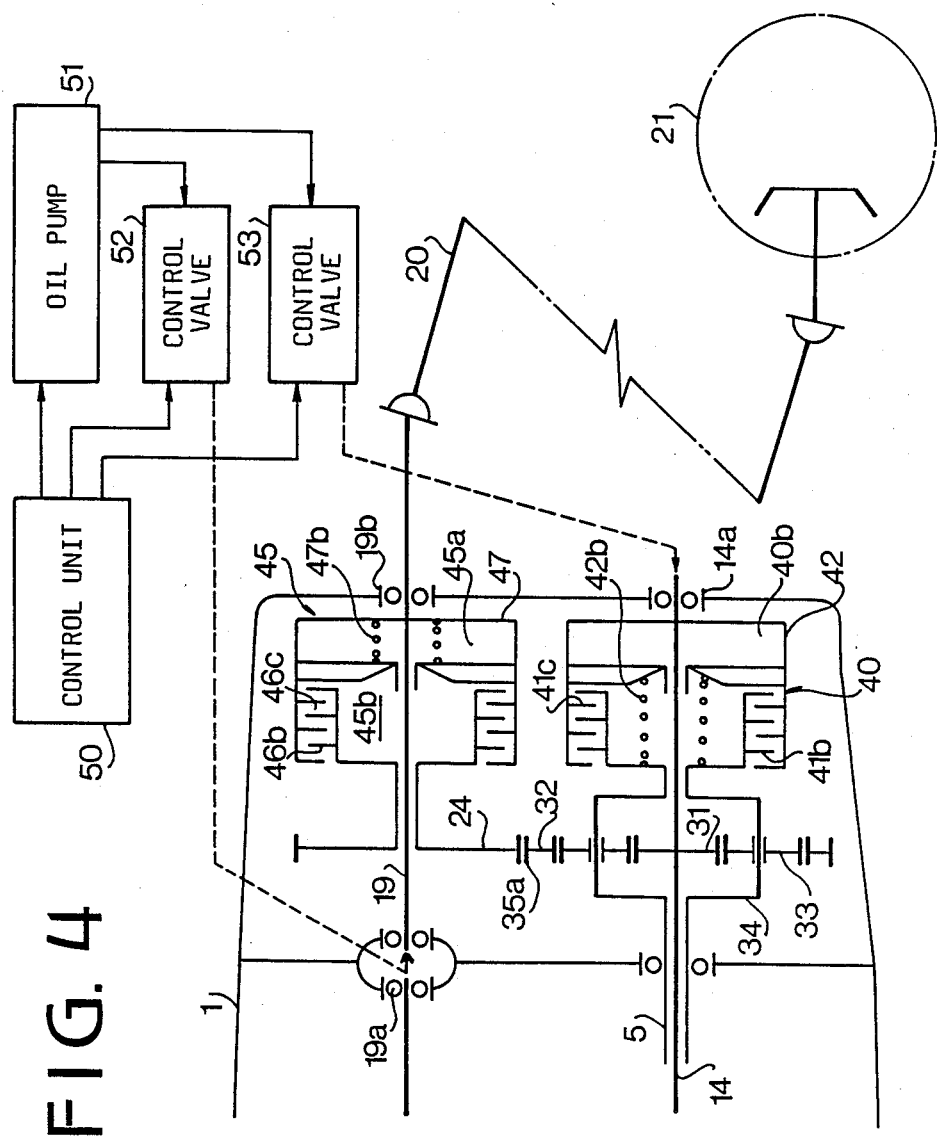

POWER TRANSMITTING SYSTEM FOR A FOUR-WHEEL DRIVE VEHICLE

BACKGROUND OF THE INVENTION

The present invention relates to a system for transmitting the power of an engine to four wheels of a four-wheel drive vehicle.

In a conventional four-wheel drive vehicle having a central differential, which is called a full time four-wheel drive vehicle, the central differential operates to uniformly distribute the torque of an engine to the front wheels and to the rear wheels of the vehicle.

It is known that the distribution ratio of the torque influences the driveability, steerability, stability, and starting characteristic of the vehicle. Namely, when the distribution to the front wheel is increased, a stable cornering characteristic at high vehicle speed is established, and when distribution to the rear wheels is increased, steerability at low vehicle speed is improved. In the conventional four-wheel drive vehicle, the distribution ratio of the torque for the front wheels to rear wheels can not be changed.

SUMMARY OF THE INVENTION

The object of the present invention is to provide a system which may change the distribution ratio of torque to front wheels and rear wheels in accordance with driving conditions of a four-wheel drive vehicle.

The other objects and features of this invention will become understood from the following description with reference to the accompanying drawings.

BRIEF DESCRIPTION OF DRAWINGS

FIGS. 1a and 1b show a schematic diagram of a four-wheel drive power transmission system in a first embodiment of the present invention; and FIGS. 2 to 4 show schematic diagrams of four-wheel drive power transmission systems in second, third and fourth embodiments of the present invention, respectively.

DETAILED DESCRIPTION OF THE PREFERRED EMBODIMENT

Figure 1A:
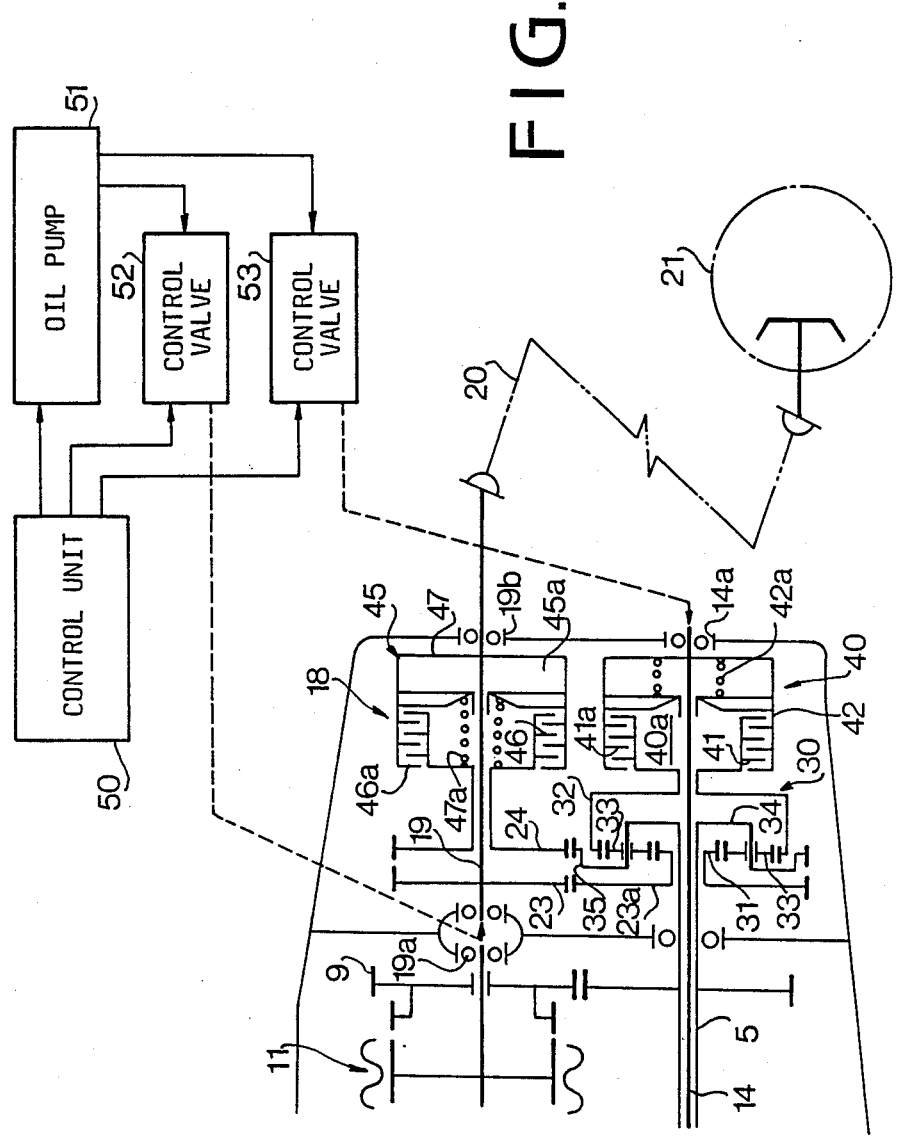

FIGS. 1a and 1b show a power transmission system for a four-wheel drive motor vehicle to which the present invention is applied. An engine 1 is longitudinally mounted on the motor vehicle at a front portion thereof, thus forming a transaxle type. The power transmission system housed in a transmission case comprises a clutch 2, transmission 4 and transfer device 18. The transmission 4 has an input shaft 3, a tubular output shaft 5 parallel with the input shaft 3, four pairs of change-speed gears 6 to 9 corresponding to first to fourth speed gears, and synchronizers 10 and 11. The synchronizers 10 and 11 are disposed between the gears 6 and 7 and between the gears 8 and 9, respectively. A reverse drive gear 12 mounted on the input shaft 3 meshes with a gear 13 formed on one side of a sleeve of the synchronizer 10 through an idler gear (not shown) for reverse drive.

A front drive shaft 14 is rotatably supported in the output shaft 5 and by a bearing 14a. A drive pinion 15 at the front end of the shaft 14 meshes with a crown gear 17 of a front differential 16 so as to transmit the power to the front wheels.

In a transfer device 18 disposed behind the transmission, a rear drive shaft 19 is disposed in parallel with the front drive shaft 14. The rear drive shaft 19 is connected to rear wheels through a propeller shaft 20 and a rear differential 21. The shaft 19 is supported by bearings 19a and 19b.

The transfer device 18 has a planetary gear device 30, disposed so as to serve as a central differential. The planetary gear device 30 comprises a sun gear 31, a ring gear 32 having internal teeth, planet pinions 33 in mesh with both gear 31 and the internal teeth of ring gear 32, and a carrier 34 supporting the pinions 33. A first gear 35 is formed on the carrier 34. The carrier 34 is connected with the output shaft 5 and the sun gear 31 is connected to a second gear 23a which is in mesh with a third gear 23 securely mounted on the rear drive shaft 19. The first gear 35 meshes with a fourth gear 24 which is rotatably mounted on the rear drive shaft 19.

In order to control the distribution of torque to the front and rear wheels, or to lock the differential mechanism of the planetary gear device, first and second fluid operated multiple-disk friction clutches 40 and 45 are provided on front drive shaft 14 and rear drive shaft 19. The first clutch 40 has inner disks 41 connected to the ring gear 32 of the planetary gear device 30, movable outer disks 41a secured to a drum 42, an oil chamber 40a and a spring 42a. The drum 42 is connected with the front drive shaft 14. The second clutch 45 comprises movable inner disks 46 connected to the gear 24, a drum 47 having outer disks 46a and being secured to the rear drive shaft 19, an oil chamber 45a, and a spring 47a.

The system for controlling the torque distribution has a control unit 50, an oil pump 51, and first and second control valves 52 and 53. Control valves 52, 53 are provided to supply oil to the clutches 40 and 45. The control unit 50 selects an appropriate torque distribution ratio according to driving conditions. The output signal of the control unit 50 is supplied to the valves 52 and 53, so as to control the oil pressure in the clutches 40 and 45.

When the vehicle is driven in ordinary driving, which is the most common driving condition, the control unit 50 produces signals to close the control valves 52, 53 so as to reduce the oil pressure applied to chambers 40a and 46a. Thus, the first clutch 40 engages and the second clutch 45 disengages by operations of the springs 42a and 46a. Accordingly, the ring gear 32 is coupled to the front drive shaft 14.

The power of the engine 1 is transmitted to the transmission 4 through the clutch 2 and the input shaft 3 and further to the carrier 34 of the planetary gear device 30 through the output shaft 5. The torque is transmitted to the front wheels through the pinions 33, ring gear 32, first clutch, front drive shaft 14 and the front differential 16. The torque of the carrier 34 is transmitted to the rear wheels through pinions 33, sun gear 31, gears 23a, 23, rear drive shaft 19, propeller shaft 20 and the rear differential 21. The difference between the speed of the front and rear wheels is absorbed as the plant pinions 33 walk around the sun gear and on the ring gear 32. Thus, the planetary gear device 30 operates as a central differential. Accordingly, a full time four-wheel driving mode with the central differential function is established. Since the torque is transmitted to the rear and front wheels through the sun gear 31 and the ring gear 32, respectively, the torque is distributed in accordance with the difference between the gear ratios of the sun gear 31 and the ring gear 32 (the diameter of the ring gear is larger than the sun gear). Therefore, the torque $T_F$ of the front wheels is larger than the torque $T_R$ of the rear wheels ($T_F > T_R$) thereby improving steering stability during cornering of the vehicle.

When the oil pressure in the first and second clutches 40, 45 is increased, the torque of the first clutch 40 is decreased and the torque of the second clutch 45 is increased. Since the torque is additionally transmitted to the rear drive shaft 19, the rear torque is increased. Consequently, the front torque is reduced.

When the vehicle is driven on a rough road, the control unit 50 produces lock signals so as to open the control valve 52 and to close the control valve 53. Thus, the oil pressure is applied to the chamber 47a of clutch 45, thereby engaging both clutches. Accordingly, the torque of the output 5 is transmitted to the front wheels through carrier 34, pinions 33, ring gear 32 and clutch 40, and is directly transmitted to the rear wheels through the gears 35, 24 and clutch 45. A part of the torque transmitted to the rear wheels is transmitted to the front wheels through the gears 23, 23a, sun gear 31, pinions 33, and ring gear 32. Since the diameters of the gears 32, 35 and 24 are substantially equal, the torque $T_F$ substantially equals the torque $T_R$ ($T_F \approx T_R$).

When the vehicle negotiates a corner at low or middle speed, both control valves are opened, so that the clutch 40 is disengaged. Accordingly, the torque is not transmitted to the front wheels, thereby improving steerability.

The conditions of the clutches for the aforementioned torque distributions are shown in the following table.

TABLE I

| Driving Condition | First Clutch 40 | Second Clutch 45 | Torque Distribution |
| --- | --- | --- | --- |
| Ordinary Driving | Engage | Disengage | $T_F > T_R$ |
| Rough Road | Engage | Engage | $T_F \approx T_R$ |
| Cornering at low or middle speed | Disengage | Engage | $T_F = O$ or $T_F << T_R$ |

During ordinary driving which is frequently used, both clutches 40 and 45 are not supplied with oil. Accordingly, loss of energy can be reduced.

Figure 2:
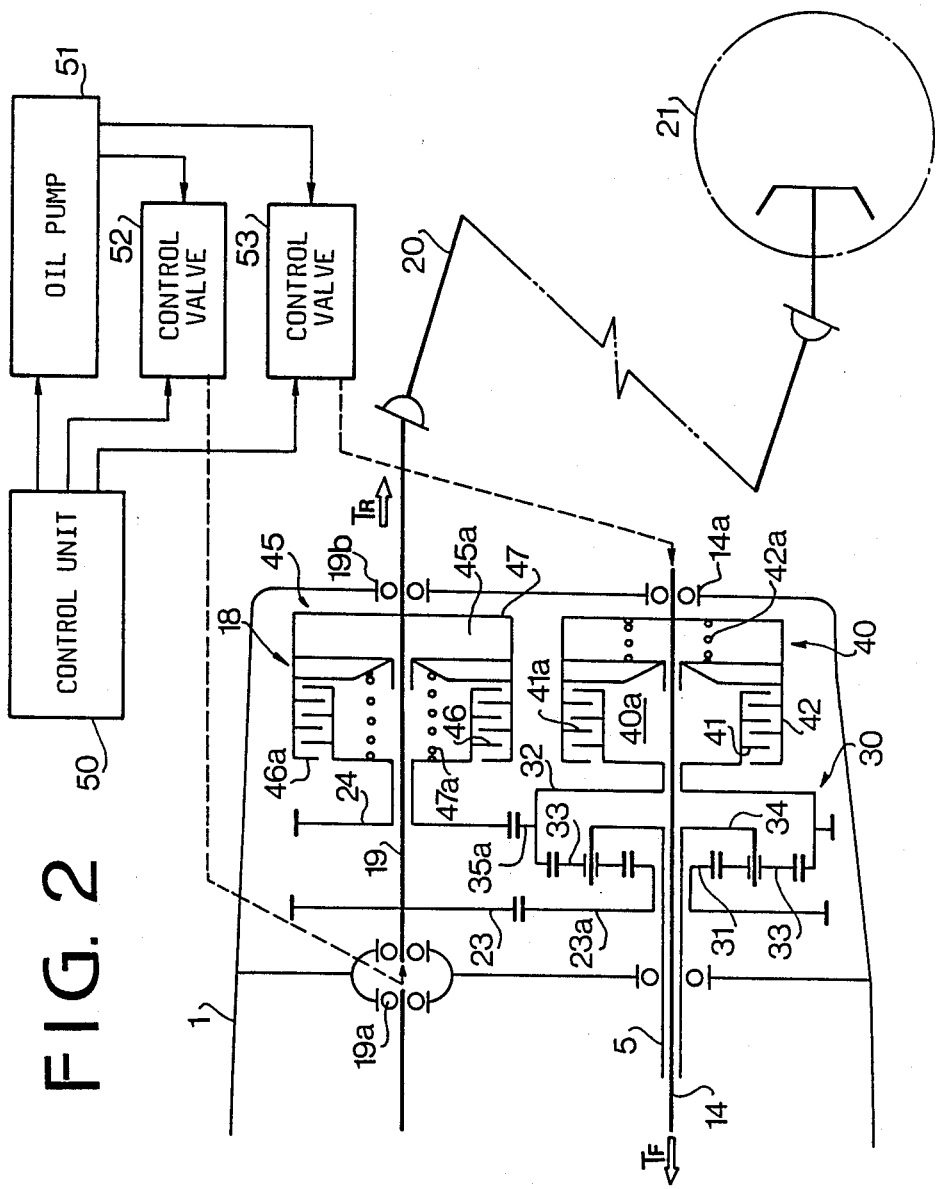

FIG. 2 shows the second embodiment of the present invention. The contruction of the power transmission system is the same as the first embodiment except for the arrangement of the planetary gear device in the transfer device 18.

In the second embodiment, a first gear 35a corresponding to the first gear 35 in the first embodiment is formed on the periphery of the ring gear 32. The diameter of the first gear 35a is the same as the second gear 23a. Other parts of FIG. 2 are the same as FIG. 1 and are identified by the same references. The operation of the system is also the same as the first embodiment.

Figure 3:
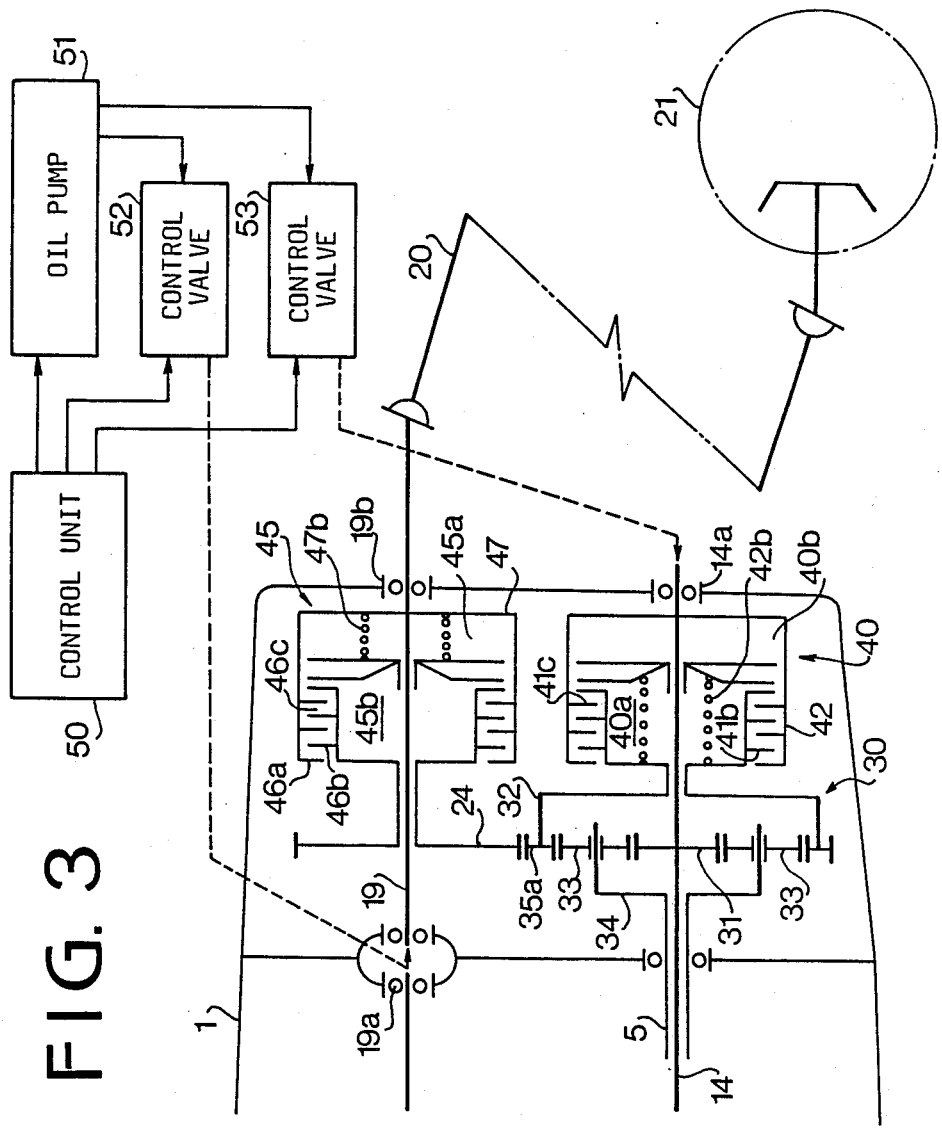

In the third embodiment of FIG. 3, the planetary gear device 30 is the same as the device 30 in FIG. 2. In the device of FIG. 3, the second and third gears 23a and 23 in FIG. 2 are not provided, and the first and second clutches 40, 45 are different from those of FIG. 2 in construction. Namely, the first clutch 40 has movable inner disks 41b, outer disks 41c, oil chamber 40b and spring 42b. The second clutch 45 comprises disks 46b, movable outer disks 46c and oil chamber 45b, and spring 47b.

When the vehicle is driven in ordinary driving, the control unit 50 produces signals to close the control valves 52, 53 so as to reduce the oil pressure applied to chambers 40b and 45b. Thus, the first clutch 40 disengages and the second clutch 45 engages.

Accordingly, the torque is transmitted to the front wheels through carrier 34, pinions 33, sun gear 31, and front drive shaft 14. The torque is also transmitted to the rear drive shaft 19 through carrier 34, pinions 33, ring gear 32, gears 35a, 24. The difference between the speed of the front and rear wheels is absorbed by the planetary gear device 30 operating as a central differential. The torque is distributed in accordance with the difference between the gear ratios of the sun gear 31 and the ring gear 32. Therefore, the torque $T_F$ of the front wheels is smaller than the torque $T_R$ of the rear wheels ($T_F < T_R$).

When the vehicle is driven on a rough road, the control unit 50 produces lock signals so as to close the control valve 52 and to open the control valve 53. Thus, the oil pressure is applied to the chamber 40b of clutch 40, thereby engaging both clutches. Accordingly, the torque of the output shaft 5 is transmitted to the front wheels through carrier 34, pinions 33, ring gear 32 and clutch 40, and to the rear wheels through gears 35a, 24 and clutch 45. Since the diameters of the gears 32, 35a and 24 are substantially equal, the torque $T_F$ is substantially equal to the torque $T_R$ ($T_F \approx T_R$).

When the vehicle negotiates a corner at low or middle speed, both control valves 52, 53 are opened, so that the clutch 45 is disengaged. Accordingly, the torque is not transmitted to the rear wheels, thereby improving steerability.

The conditions of clutches for the aforementioned torque distributions are shown in the following table.

TABLE II

| Driving Condition | First Clutch 40 | Second Clutch 45 | Torque Distribution |
| --- | --- | --- | --- |
| Ordinary Driving | Disengage | Engage | $T_F < T_R$ |
| Rough Road | Engage | Engage | $T_F \approx T_R$ |
| Cornering at low or middle speed | Engage | Disengage | $T_R = O$ or $T_F >> T_R$ |

In the fourth embodiment shown in FIG. 4, the carrier 34 connected to the output shaft 5 which is connected to the movable inner disks 41b of the clutch 40. Other parts of the system are the same as the third embodiment of FIG. 3. Accordingly the same references are used for corresponding parts. The operation of the system of FIG. 4 is also the same as the system of FIG. 3.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A power transmitting system for a four-wheel drive motor vehicle having an engine and a transmission connected to the engine comprising:
   a front drive shaft for transmitting torque of the transmission to front wheels of the vehicle;
   a rear drive shaft for transmitting torque of the transmission to rear wheels of the vehicle;

a planetary gear device connected to the transmission for transmitting power of the transmission;

first and second torque distribution devices connected to the front drive shaft and rear drive shaft, respectively, each of the torque distribution devices including clutch means for transmitting an output of the planetary gear device to a corresponding of the drive shafts;

control means continuously responsive to driving conditions of the vehicle for rendering the clutch means operative for automatically distributing via said first and second torque distribution devices different and changing ratios of torque to the front and rear drive shaft according to the driving conditions of the vehicle.

2. The system according to claim 1, wherein said planetary gear device comprises a sun gear connected to an output of the transmission, a carrier, a plurality of planetary gears on said carrier, and a ring gear, said ring gear and said sun gear meshing with said planetary gears.

3. The system according to claim 2, wherein said rear drive shaft via a corresponding clutch means is connected to, as output from, said carrier, and said rear drive shaft is connected to, as an input to, said sun gear when said corresponding clutch means is engaged, said rear drive shaft being connected to, as an output from, said sun gear when said corresponding clutch means is disengaged, and said front drive shaft via a corresponding clutch means is connected to, as an output from, said ring gear.

4. The system according to claim 2, wherein said rear drive shaft via a corresponding clutch means is connected to, as output from, said ring gear, and said rear drive shaft is connected to, as an input to, said sun gear when said corresponding clutch means is engaged, said rear drive shaft being connected to, as an output from, said sun gear when said corresponding clutch means is disengaged, and said front drive shaft via a corresponding clutch means is connected to, as an output from, said ring gear.

5. The system according to claim 2, wherein said front drive shaft via a corresponding clutch means is connected to, as output from, said ring gear, and said front drive shaft is connected to, as an input to, said sun gear when said corresponding clutch means is engaged, said front drive shaft being connected to, as an output from, said sun gear when said corresponding clutch means is disengaged, and said rear drive shaft via a corresponding clutch means is connected to, as an output from, said ring gear.

6. The system according to claim 2, wherein said front drive shaft via a corresponding clutch means is connected to, as output from, said carrier, and said front drive shaft is connected to, as an input to, said sun gear when said corresponding clutch means is engaged, said front drive shaft being connected to, as an output from, said sun gear when said corresponding clutch means is disengaged, and said rear drive shaft via a corresponding clutch means is connected to, as an output from, said ring gear.

7. The system according to claim 1, wherein said control means is responsive to cornering at low and middle vehicle speed as some of the driving conditions for controlling said clutch means for distributing substantially zero torque to said front drive shaft or a very high distribution ratio of the transmission torque distributed to said rear drive shaft relative to said front drive shaft.

8. The system according to claim 1, wherein said control means is responsive to rough road driving as one of the driving conditions for controlling said clutch means for distributing substantially equal torque of the transmission to said rear drive shaft and to said front drive shaft.

9. The system according to claim 1, wherein said control means is responsive to ordinary driving as one of the driving conditions for controlling said clutch means for distributing substantially a high torque ratio of torque of the transmission to said front drive shaft relative to said rear drive shaft.

10. The system according to claim 9, wherein said clutch means are spring-biased fluid-pressure controlled clutches and during said ordinary driving are controlled by said control means so as not to provide fluid pressure, thereby reducing loss of energy.

11. The system according to claim 10, wherein said clutch means for transmitting output of said planetary gear device to said front drive shaft is a normally engaged clutch, and said clutch means for transmitting output of said planetary gear device to said rear drive shaft is normally disengaged clutch.

12. The system according to claim 1, wherein said clutch means are variable torque trasmitting clutches, each having a continuously variable transmitting torque ratio of its output to input torque, for changing the ratio of torque of the transmission to the front and rear drive shafts according to the driving conditions of the vehicle.

13. The system according to claim 12, wherein each of said clutches is a fluid-pressure controlled clutch responsive to said control means providing said continuously variable transmitting torque ratio of its output to input torque as a variable function of the fluid pressure.

14. In a power transmitting system for a four-wheel drive motor vehicle having an engine, a transmission connected to the engine and having an output shaft, a main drive shaft for transmitting power to main wheels of the vehicle, an auxiliary drive shaft for transmitting power to auxiliary wheels of the vehicle, central differential means connected to the output shaft and output means of the central differential means operatively connected to the main drive shaft and the auxiliary drive shaft, respectively, for transmitting power of the engine from the transmission to the drive shafts through the central differential means and permitting differential action with speed difference between the main and auxiliary wheels, and both the output means having different speed ratios with respect to each other, the improvement of the system which comprises:

normally engaged clutch means connected between the output means and the auxiliary drive shaft, said normally engaged clutch means having a variable transmitting torque ratio of its output to input torque, including zero transmitting torque ratio for disengaging the auxiliary drive shaft from said output means;

normally disengaged clutch means connected between the output means and the main drive shaft, said normally disengaged clutch means having a variable transmitting torque ratio of its output to input torque for engaging the output means to the main drive shaft;

control means responsive to driving conditions of the vehicle for producing a signal adapted to control distribution ratio of torque from the transmission through the central differential means to the main drive shaft and the auxiliary drive shaft via said clutch means;

said clutch means for being responsive to the signal to change the respective transmitting torque ratio of the respective clutch means so as to control the distribution ratio of the torque from the transmission to the front wheels and the rear wheels.

15. The system according to claim 14, wherein the main drive shaft is a front drive shaft and the auxiliary drive shaft is a rear drive shaft.

16. The system according to claim 14, wherein the main drive shaft is a rear drive shaft and the auxiliary drive shaft is a front drive shaft.

17. The system according to claim 14, wherein said output means comprises two output members of said central differential means, said normally engaged clutch means is connected to one of said output members and said normally disengaged clutch means is connected to the other of said output members.

18. The system according to claim 17, wherein one of said output members is also a member constituting an input means of said central differential means, said input means is connected to said output shaft of said transmission.

19. The system according to claim 18, wherein said central differential means is a planetary gear device having a carrier, said member constituting said input means of said central differential means is said carrier.

20. The system according to claim 14, wherein said output means comprises a single output member.

* * * * *